(12) United States Patent
Acharya et al.

(10) Patent No.: US 6,834,123 B2
(45) Date of Patent: Dec. 21, 2004

(54) METHOD AND APPARATUS FOR CODING OF WAVELET TRANSFORMED COEFFICIENTS

(75) Inventors: Tinku Acharya, Chandler, AZ (US); Prabir K. Biswas, Kharagpur (IN); Kokku Raghu, Kharagpur (IN)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 09/867,781

(22) Filed: May 29, 2001

(65) Prior Publication Data

US 2002/0186892 A1 Dec. 12, 2002

(51) Int. Cl.⁷ .................................................. G06K 9/36
(52) U.S. Cl. ..................................................... 382/240
(58) Field of Search ................................ 382/232, 236, 382/238, 240, 242, 248, 250; 348/384.1, 394.1–395.1, 400.1–404.1, 407.1–416.1, 420.1, 421.1, 425.2, 430.1, 431.1; 375/240.02–240.03, 240.11–240.16, 240.18–240.2, 240.22–240.25; 708/203, 300, 307–308, 313, 316–317, 400–405

(56) References Cited

U.S. PATENT DOCUMENTS

| | | | | |
|---|---|---|---|---|
| 5,321,776 | A | * 6/1994 | Shapiro | ...................... 382/240 |
| 5,481,308 | A | 1/1996 | Hartung et al. | |
| 5,563,960 | A | 10/1996 | Shapiro | |
| 5,710,835 | A | 1/1998 | Bradley | |
| 5,748,786 | A | 5/1998 | Zandi et al. | |
| 5,777,678 | A | 7/1998 | Ogata et al. | |
| 6,084,912 | A | * 7/2000 | Reitmeier et al. | ..... 375/240.11 |
| 6,125,201 | A | 9/2000 | Zador | |
| 6,144,773 | A | 11/2000 | Kolarvo et al. | |
| 6,157,746 | A | * 12/2000 | Sodagar et al. | ............. 382/240 |
| 6,222,941 | B1 | 4/2001 | Zandi et al. | |
| 6,236,758 | B1 | * 5/2001 | Sodagar et al. | ............. 382/240 |
| 6,269,192 | B1 | * 7/2001 | Sodagar et al. | ............. 382/240 |
| 6,298,163 | B1 | * 10/2001 | Sodagar et al. | ............. 382/240 |
| 6,359,928 | B1 | * 3/2002 | Wang et al. | ........... 375/240.05 |
| 6,381,280 | B1 | 4/2002 | Lynch et al. | |
| 6,549,666 | B1 | 4/2003 | Schwartz | |
| 6,640,015 | B1 | 10/2003 | Lafruit et al. | |
| 2003/0108247 | A1 | 6/2003 | Acharya et al. | |

FOREIGN PATENT DOCUMENTS

| | | |
|---|---|---|
| EP | 0 892 557 A1 | 1/1999 |
| EP | 0 905 978 A2 | 3/1999 |
| EP | 0 920 213 A2 | 6/1999 |
| EP | 0 926 896 A2 | 6/1999 |
| WO | WO 93/17524 | 9/1993 |

OTHER PUBLICATIONS

Said, et al., "A New, Fast, and Efficient Image Codec Based on Set Partitioning in Hierarchical Trees", XP 000592420,. IEEE Transactions on Circuits and Systems for Video Technology, vol. 6, No. 3, Jun. 1996, pp. 243–250.

"Embedded Image Coding Using Zerotrees of Wavelet Coefficients" IEEE Transactions on Signal Processing, vol. 41, No. 12, pp 3445–3459, Dec. 1993.

U.S. patent application Ser. No. 09/723,123, Acharya et al., filed Nov. 2, 2000.

U.S. patent application Ser. No. 09/390,255, Acharya et al., filed Sep. 3, 1999.

Weeks, et al., "3–D Discrete Wavelet Transform Architectures", University of Southwestern Louisiana, Lafayette, LA, 1998 IEEE, pp. 57–60.

Goh, et al.,"New 3–D Wavelet Transform Coding Algorithm for Images Sequences", Electronics Letters, Feb. 18, 1993, vol. 29, No. 4, pp. 401–402.

\* cited by examiner

*Primary Examiner*—Jose L. Couso
(74) *Attorney, Agent, or Firm*—Sharon Wong

(57) ABSTRACT

Embodiments of a method and apparatus for coding and decoding wavelet transformed coefficients is described.

32 Claims, 8 Drawing Sheets

|         | 001  001 | 100  001  | 000  000 |
|---------|----------|-----------|----------|
|         | 000  010 | -001 000  | 100  011 |
|         |          | 000  010  | 000 -001 |
| Level 1 |          | 000  000  | 001  000 |
| Level 0 |          |           |          |

Figure 6

| 001  001 | 100  001 | 000  000 |
|----------|----------|----------|
| 000  010 | -001 000 | 100  011 |
|          | 000  010 | 000 -001 |
|          | 000  000 | 001  000 |

Figure 7

| 001  001 | 100  001 | 000  000 |
|----------|----------|----------|
| 000  010 | -001 000 | 100  011 |
|          | 000  010 | 000 -001 |
|          | 000  000 | 001  000 |

Figure 8

| 001 001 | 10_0_ 001 | 000 000 |
|---------|-----------|---------|
| 000 010 | -001 000  | 10_0_ 01_1_ |
|         | 00_0_ 01_0_ | 000 -001 |
|         | 00_0_ 00_0_ | 001 000 |

Figure 9

| 001 001 | 1_00_ 001 | 000 000 |
|---------|-----------|---------|
| 000 010 | -001 000  | 1_00_ 0_11_ |
|         | 000 010   | 000 -001 |
|         | 000 000   | 001 000 |

Figure 10

| 001 001 | 100 001 | 000 000 |
|---------|---------|---------|
| 000 010 | -001 000 | 100 011 |
|         | 000 010 | 000 -001 |
|         | 000 000 | 001 000 |

Figure 11

Fig 12: Proposed Decoder State Diagram

| 001 001 | 00  001 | 000 000 |
|---------|---------|---------|
| 000 010 | -001 000 | 00  011 |
|         | 000 010 | 000 -001 |
|         | 000 000 | 001 000 |

Figure 17

| 001 001 | 100 001 | 000 000 |
|---------|---------|---------|
| 000 010 | -001 000 | 100 011 |
|         | 000 010 | 000 -001 |
|         | 000 000 | 001 000 |

Figure 18

METHOD AND APPARATUS FOR CODING OF WAVELET TRANSFORMED COEFFICIENTS

RELATED APPLICATIONS

This patent application is related to U.S. patent application Ser. No. 09/390,255, titled "Zerotree Encoding of Wavelet Data," filed Sep. 3, 1999, by Acharya et al.; U.S. patent application Ser. No. 09/723,123, titled "Encoding of Wavelet Transformed Error Data," filed Nov. 27, 2000, by Acharya et al.; and concurrently filed U.S. patent application Ser. No. 09/867,784, titled "Method and Apparatus for Three-Dimensional Wavelet Transform," filed May 29, 2001, by Acharya et al.; all of the foregoing assigned to the assignee of the presently claimed subject matter. Concurrently filed U.S. patent application Ser. No. 09/867,784, titled "Method and Apparatus for Three-Dimensional Wavelet Transform," filed May 29, 2001, by Acharya et al. is herein incorporated by reference.

BACKGROUND

This disclosure is related to image compression and/or decompression.

As is well-known, discrete wavelet transform (DWT) approaches have been employed in compression and decompression of images and video. One aspect of these approaches frequently employs a process often referred to as embedded zerotree (EZT) coding or encoding. Some of the drawbacks of the existing embedded zero tree coding process include two passes for each level of coding, ie, a dominant pass and a subordinate pass, and, high computational complexity not suitable for interactive video compression. A need, therefore, exists for an approach to EZT coding that addresses these issues.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 6 is a sample portion of a transformed image to be coded;

FIG. 7 is the sample portion of FIG. 6 at a point in a process of applying the embodiment of FIG. 5;

FIG. 8 is the sample portion of FIG. 6 at a point in a process of applying the embodiment of FIG. 5;

FIG. 9 is the sample portion of FIG. 6 at a point in a process of applying the embodiment of FIG. 5;

FIG. 10 is the sample portion of FIG. 6 at a point in a process of applying the embodiment of FIG. 5;

FIG. 11 is the sample portion of FIG. 6 at a point in a process of applying the embodiment of FIG. 5;

FIG. 13 is the encoded sample portion of FIG. 11 at a point in a process of applying an embodiment to decode the encoded sample portion;

FIG. 14 is the encoded sample portion of FIG. 11 at a point in a process of applying an embodiment to decode the encoded sample portion;

FIG. 15 is the encoded sample portion of FIG. 11 at a point in a process of applying an embodiment to decode the encoded sample portion;

FIG. 16 is the encoded sample portion of FIG. 11 at a point in a process of applying an embodiment to decode the encoded sample portion;

FIG. 17 is the encoded sample portion of FIG. 11 at a point in a process of applying an embodiment to decode the encoded sample portion; and FIG. 18 is the encoded sample portion of FIG. 11 at a point in a process of applying an embodiment to decode the encoded sample portion.

DETAILED DESCRIPTION

In the following detailed description, numerous specific details are set forth in order to provide a thorough understanding of the claimed subject matter. However, it will be understood by those skilled in the art that the claimed subject matter may be practiced without the se specific details. In other instances, well-known methods, procedures, components and circuits have not been described in detail in order so as not to obscure the claimed subject matter.

An embodiment of a method and apparatus for coding wavelet transformed coefficients is provided that provides an improvement over current EZT coding approaches in terms of computational complexity and compression performance. One aspect of this improvement, for this particular embodiment, although, of course, the claimed subject matter is not limited in scope to this particular embodiment, is a reduction in computational complexity by reducing the number of scans performed during the EZT coding process, as described in more detail hereinafter.

As shall also be described in greater detail infra., for this embodiment, a bit-based conditional coding is applied to the DWT coefficients. For example, during coding, one or more binary-valued variables, eg, a bit, is employed, where the value of the variable depends on whether one or more conditions applied to the coefficient being coded is true or false. As just one example, a condition may relate to the absolute value of the coefficient compared relative to a threshold. Likewise, typically, DWT coefficients have multiple levels. In this particular embodiment, the threshold of the next sequentially increasing level from a particular level of DWT coefficients is a multiplicative factor greater than one times the threshold of the particular level. For example, the embodiment described infra. employs a multiplicative factor of two, although, again, the claimed subject matter is not limited in scope in this respect. Typically, although not necessarily, such an embodiment provides improved results when applied to low energy DWT coefficients, that is, where several of the coefficients are zero or near zero.

Figure 1:
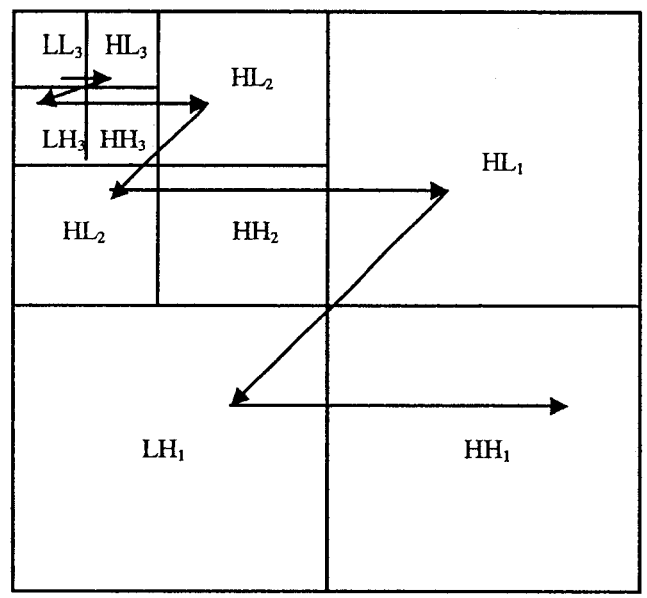
FIG. 1 is a schematic diagram illustrating an order for scanning coefficients of a transformed image.

In this embodiment, the discrete wavelet transform (DWT) decomposes an image into four subbands, one low frequency subband (LL) and three high frequency subbands (LH, HL, HH). The LL subband has the characteristics of the original image and may be decomposed in multiple levels as shown in FIG. 1.

Again, for this particular embodiment, when applying embedded coding of the wavelet coefficients, a particular order of scanning is employed. The coefficients are scanned in the order as shown by the arrows in FIG. 1, so that a child coefficient is not scanned before its parent is scanned. The scan starts from the lowest frequency subband (LL3), and does not move to another subband until the coefficients of the present subband are scanned. Once the scanning of the subbands of one level of transform is complete, the scan moves to the next level of subbands. The scanning inside a subband is done row-wise in this particular embodiment.

In this embodiment, improved efficiency may result from the following approach. If the magnitude of a coefficient (c) is not significant with respect to a certain threshold ($T_0$), i.e., $|c| \leq T_0$, then it is also not significant for the remaining levels. In this embodiment, the threshold values for subsequent passes are larger in magnitude than $T_0$.

Figure 2:
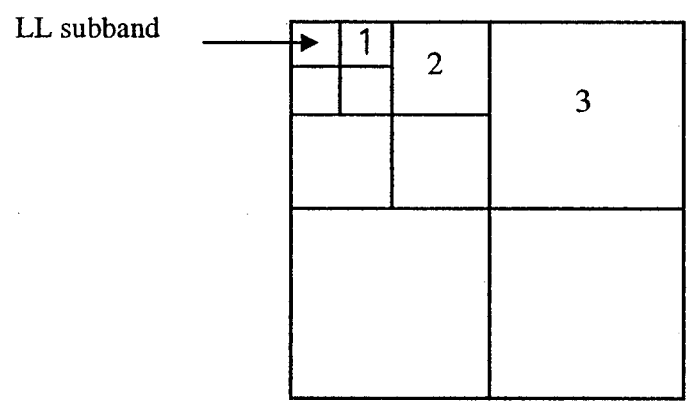
FIG. 2 is a schematic diagram illustrating subbands formed in a transformed image.

As shown in FIG. 2, the DWT matrices are discrete wavelet transformed (DWT) with the resultant subbands of the form illustrated. The labels (1, 2, 3) indicate the level number of the subbands.

Figure 3:
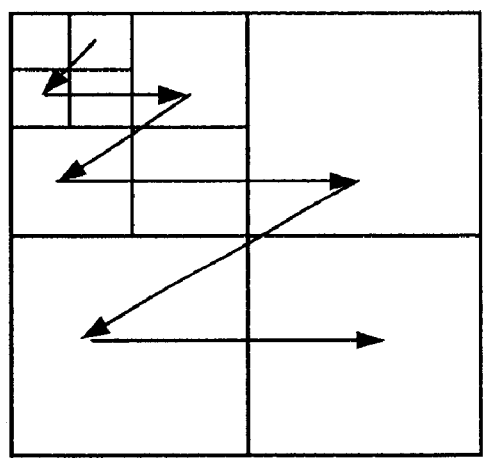
FIG. 3 is a schematic diagram illustrating an order for scanning coefficients of a transformed image for an embodiment.

In this embodiment, the starting threshold is taken as 1, although, of course, the claimed subject matter is not limited to a particular starting threshold. In each successive pass, the threshold is doubled, although, again, as previously indicated, the thresholds are not limited to being doubled. The total number of such passes for this embodiment is $\lfloor \log_2(\max) \rfloor + 1$, where "max" denotes the maximum value among the magnitudes of the coefficients to be encoded, again, for this particular embodiment. The scanning pattern for the coefficients employed in this embodiment is shown in FIG. 3.

Figure 4:
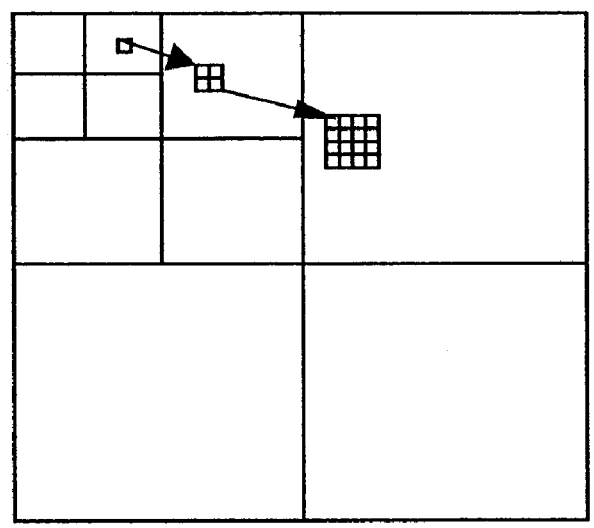
FIG. 4 is a schematic diagram illustrating a typical parent-child relationship for subbands in a transformed image.

A parent-child relation for DWT coded frames is shown in FIG. 4. The four pixels at level 2 are the children of the pixel marked in level 1. The sixteen pixels at level 3 are also the descendants of marked pixel in the $1^{st}$ level. As previously indicated, in this embodiment, the coefficients are scanned in such a way so that no finer level coefficient is scanned before the coarser ones, as indicated in FIG. 4.

As previously indicated, here bit-based conditional coding approach is employed. In standard EZT coding processes, for every condition, a symbol, eg, P, N, R, IZ, each taking 2 bits to code, is generated. In this particular embodiment, instead, a bit 1 or 0 may be coded, depending on whether the particular condition is true or false.

Here, the LL subband is not included in the bit-plane coding. The LL subband is directly stored or transmitted, instead. One may, therefore, independently encode the wavelet coefficients in the LL subband using any coding technique, such as a lossless variable-length encoding technique, including, for example, arithmetic coding, Huffman coding, Lempel-Ziv coding, etc.

Figure 5:
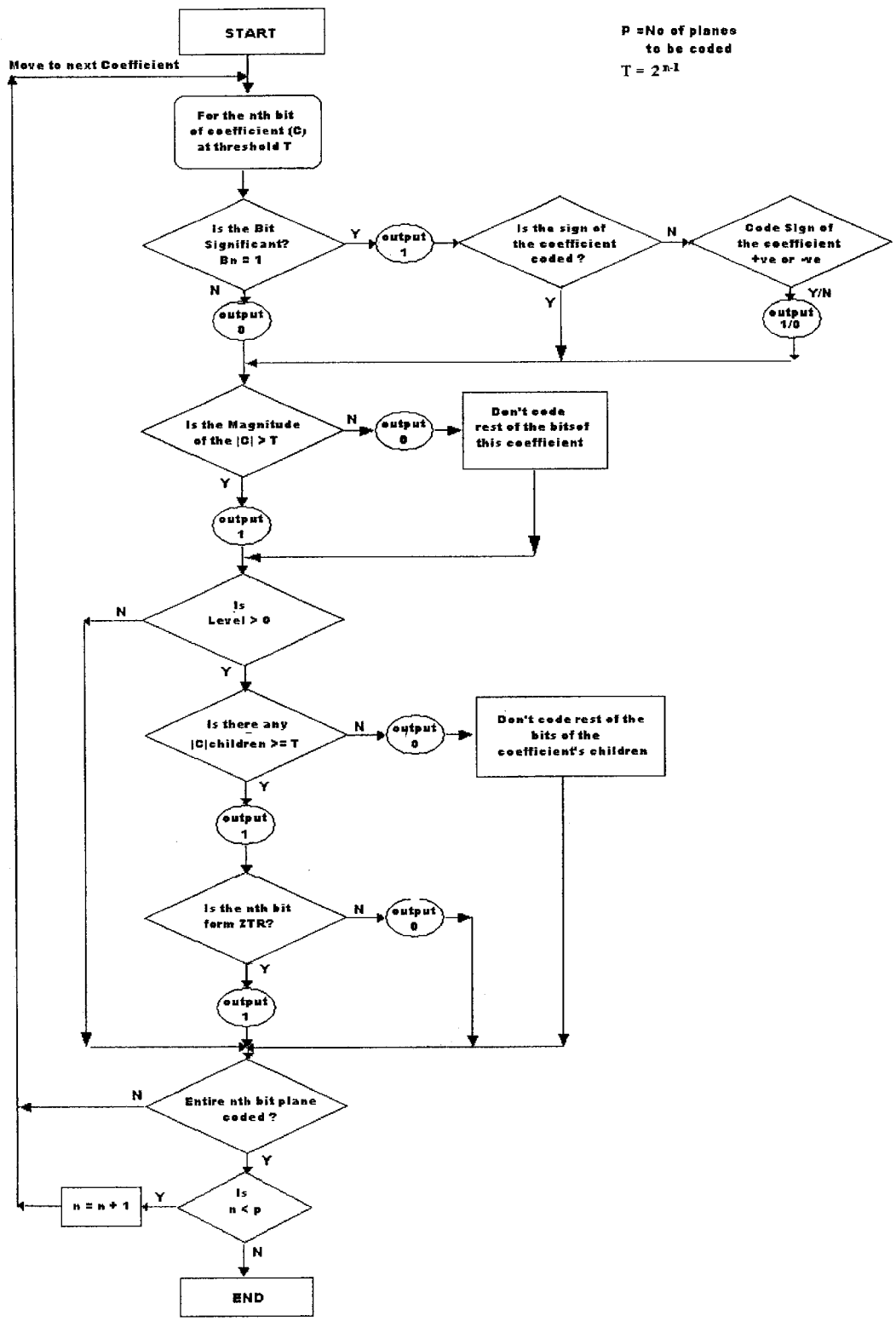
FIG. 5 is a flowchart illustrating an embodiment to be applied to code wavelet transformed coefficients.

A flowchart to illustrate one embodiment is shown in FIG. 5.

The following example will assist in the understanding of the coding scheme, although, of course, this example in no way limits the scope of the claimed subject matter. This example is provided merely for illustration. For example, while this example is applied to wavelet coefficients with low energy content in two dimensions (2D), this approach is extendable to three dimensional (3D) wavelet transforms.

The coefficients shown in FIG. 6 are provided in binary representation. The maximum value of the coefficients is max=4 (100). Hence, the total number of passes, applying the previous embodiment, is 3. Therefore, pass_index varies from 1 to 3.

Below, notation is employed to designate representation which bit is being coded in the matrix of FIG. 6. In this example, one matrix of 2×2 size at level 1 (subband #1) and one matrix of size 4×4 at level 0 (subband #2) is provided. The pass index varies from 1 to 3. Here, counting is done in reverse order, e.g., for the coefficient 001, if the pass index is 3, we are coding the most significant bit (MSB) of the coefficient and so on, although, of course, other conventions may alternatively be used.

The coefficient which is coding is represented here as $C_{Li}(x,y)$. "Li" represents the level in which the coefficient is coded, where "i" varies from 0 to number of levels. In this example, "i" takes 0 and 1. Likewise, "x,y" denotes the array location. The bit coded is represented by $B_{Pj}^{Li}(x, y)$ where "Li" represents the level in which it is coded, and "Pj" represents the pass index. An illustrative example of this notation is as follows:

$C^{L0}(4,4)$ represents the coefficent in level 0 (subband #2) which is in the $4^{th}$ row and $4^{th}$ column.

$B_{P2}^{L1}(2,2)$ represents the bit '1' in the level 1 (subband #1) and in the second pass (middle bit) of the $2^{nd}$ row and $2^{nd}$ column.

For coding the above mentioned example, three passes, designated p1, p2, and p3, are employed, and the pass index will decide the threshold to employ to determine the significance of the coefficient. In this context, 'significance of the coefficient' means comparing the whole value of the coefficient with respect to the appropriate threshold and, in this context, 'significance of the bit' refers to comparing the value of the bit in that plane.

Below, this particular embodiment is applied to the example from FIG. 6. Initially, the pass_index is one and the threshold ($T_0$) is one, although, again, the claimed subject matter is not limited to this example. For these values, the conditions indicated below in the left hand column are evaluated. If the condition is true, a "1" bit is generated. If the condition is false, a "0" bit is generated For Pass_Index=1, $T_0$ (Threshold)=1;

| Subband #1: | |
|---|---|
| | Bits Generated |
| For the bit $B_{P1}^{L1}(1,1)$ of the coefficient $C^{L1}(1,1)$ | |
| Is the bit significant ? yes | :1 |
| Is the sign bit recorded? no | |
| Is the symbol +ve ? yes | :1 |
| Is the $|C^{L1}(1,1)| > T_0$ ? no | :0 |
| Is the bit in level 0 ? no | |
| Is $|C^{L1}(1,1)|_{children} >= T_0$ ? yes | :1 |
| Is the bit form ZTR ? no | :0 |
| For the bit $B_{P1}^{L1}(1,2)$ of the coefficient $C^{L1}(1,2)$ | |
| Is the bit significant ? yes | :1 |
| Is the sign bit recorded? no | |
| Is the symbol +ve ? yes | :1 |
| Is the $|C^{L1}(1,2)| > T_0$ ? no | :0 |
| Is the bit in level 0 ? no | |
| Is $|C^{L1}(1,2)|_{children} >= T_0$ ? yes | :1 |
| Is the bit form ZTR ? no | :0 |
| For the bit $B_{P1}^{L1}(2,1)$ of the coefficient $C^{L1}(2,1)$ | |
| Is the bit significant ? no | :0 |
| Is the $|C^{L1}(2,1)| > T_0$ ? no | :0 |

-continued

Subband #1:

| | Bits Generated |
|---|---|
| Is the bit in level 0 ? no | |
| Is $|C^{L1}(2,1)|_{children} >=0$ $T_o$ ? yes | :1 |
| Is the bit form ZTR ? yes | :1 |
| For the bit $B_{P1}^{L1}(2,2)$ of the coefficient $C^{L1}(2,2)$ | |
| | |
| Is the bit significant ? no | :0 |
| Is $|C^{L1}(2,2)| > T_o$ ? yes | :1 |
| Is the bit in level 0 ? no | |
| Is $|C^{L1}(2,2)|_{children} >= T_o$ ? yes | :1 |
| Is the bit form ZTR ? no | 0 |

Therefore, in this example of application of one possible embodiment, for subband #1 the following 18 bits are generated: 1, 1, 0, 1, 0; 1, 1, 0, 1, 0; 0, 0, 1, 1; 0, 1, 1, 0. The marked-matrix after this stage of processing is illustrated in FIG. 7. In this example, bits marked with an underline are not to be traversed or coded in later passes.

Subband #2

| | Bits Generated |
|---|---|
| For the bit $B_{P1}^{L0}(1,1)$ of the coefficient $C^{L0}(1,1)$ | |
| | |
| Is the bit significant ? no | :0 |
| Is $|C^{L0}(1,1)| > T_o$ ? yes | :1 |
| Is the bit in level 0 ? yes | |
| For the bit $B_{P1}^{L0}(1,2)$ of the coefficient $C^{L0}(1,2)$ | |
| | |
| Is the bit significant ? yes | :1 |
| Is the sign bit recorded ? no | |
| Is the symbol +ve ? yes | :1 |
| Is $|C^{L0}(1,2)| > T_o$ ? no | :0 |
| Is the bit in level 0 ? yes | |
| For the bit $B_{P1}^{L0}(2,1)$ of the coefficient $C^{L0}(2,1)$ | |
| | |
| Is the bit significant ? yes | :1 |
| Is the sign bit recorded ? no | |
| Is the symbol +ve ? no | :0 |
| Is $|C^{L0}(2,1)| > T_o$ ? no | :0 |
| Is the bit in level 0 ? yes | |
| For the bit $B_{P1}^{L0}(2,2)$ of the coefficient $C^{L0}(2,2)$ | |
| | |
| Is the bit significant ? no | :0 |
| Is $|C^{L0}(2,2)| > T_o$ ? no | :0 |
| Is the bit in level 0 ? yes | |
| For the bit $B_{P1}^{L0}(1,3)$ of the coefficient $C^{L0}(1,3)$ | |
| | |
| Is the bit significant ? no | :0 |
| Is $|C^{L0}(1,3)| > T_o$ ? no | :0 |
| Is the bit in level 0 ? yes | |
| For the bit $B_{P1}^{L0}(1,4)$ of the coefficient $C^{L0}(1,4)$ | |
| | |
| Is the bit significant ? no | :0 |
| Is $|C^{L0}(1,4)| > T_o$ ? no | :0 |
| Is the bit in level 0 ? yes | |
| For the bit $B_{P1}^{L0}(2,3)$ of the coefficient $C^{L0}(2,3)$ | |
| | |
| Is the bit significant ? no | :0 |
| Is $|C^{L0}(2,3)| > T_o$ ? yes | :1 |
| Is the bit in level 0 ? yes | |
| For the bit $B_{P1}^{L0}(2,4)$ of the coefficient $C^{L0}(2,4)$ | |
| | |
| Is the bit significant ? yes | :1 |
| Is the sign bit recorded ? no | |
| Is the symbol +ve ? yes | 1 |
| Is $|C^{L0}(2,4)| > T_o$ ? yes | :1 |
| Is the bit in level 0 ? yes | |
| For the bit $B_{P1}^{L0}(3,3)$ of the coefficient $C^{L0}(3,3)$ | |

-continued

Subband #2

| | Bits Generated |
|---|---|
| Is the bit significant ? no | :0 |
| Is the $|C^{L0}(3,3)| > T_o$ ? no | :0 |
| Is the bit in level 0 ? yes | |
| For the bit $B_{P1}^{L0}(3,4)$ of the coefficient $C^{L0}(3,4)$ | |
| | |
| Is the bit significant ? yes | :1 |
| Is the sign bit recorded? no | |
| Is the symbol +ve ? no | 0 |
| Is the $|C^{L0}(3,4)| > T_o$ ? no | :0 |
| Is the bit in level 0 ? yes | |
| For the bit $B_{P1}^{L0}(4,3)$ of the coefficient $C^{L0}(4,3)$ | |
| | |
| Is the bit significant ? yes | :1 |
| Is the sign bit recorded ? no | |
| Is the symbol +ve ? yes | 1 |
| Is $|C^{L0}(4,3)| > T_o$ ? no | :0 |
| Is the bit in level 0 ? yes | |
| For the bit $B_{P1}^{L0}(4,4)$ of the coefficient $C^{L0}(4,4)$ | |
| | |
| Is the bit significant ? no | :0 |
| Is the $|C^{L0}(4,4)| > T_o$ ? no | :0 |
| Is the bit in level 0 ? yes | |

Therefore, in this example of application of one possible embodiment, for subband #2 the following 29 bits are generated: 0, 1; 1, 1, 0; 1, 0, 0; 0, 0; 0, 0; 0, 0; 0, 1; 1, 1, 1; 0, 0; 1, 0, 0; 1, 1, 0; 0, 0. The marked-matrix after this stage of processing is illustrated in FIG. 8.

For Pass_Index=2, $T_0$(Threshold)=1*2=2;

Subband #1:

| | Bits Generated |
|---|---|
| For the bit $B_{P2}^{L1}(2,2)$ of the coefficient $C^{L1}(2,2)$ | |
| | |
| Is the bit significant ? yes | :1 |
| Is the sign bit recorded? yes | |
| Is the symbol +ve ? no | :1 |
| Is the $|C^{L1}(2,2)| > T_o$ ? no | :0 |
| Is the bit in level 0 ? no | |
| Is $|C^{L1}(2,2)|_{children} >= T_o$ ? no | :0 |

The following four bits are generated for subband #1: 1, 1, 0, 0. The marked-matrix is illustrated in FIG. 9.

Subband #2:

| | Bits Generated |
|---|---|
| For the bit $B_{P2}^{L0}(1,1)$ of the coefficient $C^{L0}(1,1)$ | |
| | |
| Is the bit significant ? no | :0 |
| Is the $|C^{L0}(1,1)| > T_o$ ? yes | :1 |
| Is the bit in level 0 ? yes | |
| For the bit $B_{P2}^{L0}(2,3)$ of the coefficient $C^{L0}(2,3)$ | |
| | |
| Is the bit significant ? no | :0 |
| Is the $|C^{L0}(2,3)| > T_o$ ? yes | :1 |
| Is the bit in level 0 ? yes | |
| For the bit $B_{P2}^{L0}(2,4)$ of the coefficient $C^{L0}(2,4)$ | |
| | |
| Is the bit significant ? yes | :1 |
| Is the sign bit recorded? yes | |
| Is the $|C^{L0}(2,4)| > T_o$ ? no | :0 |
| Is the bit in level 0 ? yes | |

-continued

Subband #2:

| | Bits Generated |
|---|---|
| For the bit $B_{P2}^{L0}(3,1)$ of the coefficient $C^{L0}(3,1)$ | |
| Is the bit significant ? no | :0 |
| Is the $|C^{L0}(3,1)| > T_o$ ? no | :0 |
| Is the bit in level 0 ? yes | |
| For the bit $B_{P2}^{L0}(3,2)$ of the coefficient $C^{L0}(3,2)$ | |
| Is the bit significant ? yes | :1 |
| Is the sign bit recorded? no | |
| Is the symbol +ve ? yes | :1 |
| Is the $|C^{L0}(3,2)| > T_o$ ? no | :0 |
| Is the bit in level 0 ? yes | |
| For the bit $B_{P2}^{L0}(4,1)$ of the coefficient $C^{L0}(4,1)$ | |
| Is the bit significant ? no | :0 |
| Is the $|C^{L0}(4,1)| > T_o$ ? no | :0 |
| Is the bit in level 0 ? yes | |
| For the bit $B_{P2}^{L0}(4,2)$ of the coefficient $C^{L0}(4,2)$ | |
| Is the bit significant ? no | :0 |
| Is the $|C^{L0}(4,2)| > T_o$ ? no | :0 |
| Is the bit in level 0 ? yes | |

The following 15 bits are generated for subband #2: 0, 1; 0, 1; 1, 0; 0, 0; 1, 1, 0; 0, 0; 0, 0. The marked-matrix is illustrated in FIG. 10.
For Pass_Index=3, $T_0$(Threshold)=2*2=4.
Subband #1:
No bits are generated for subband #1.

| Subband #2 | |
|---|---|
| For the bit $B_{P3}^{L0}(1,1)$ of the coefficient $C^{L0}(1,1)$ | |
| Is the bit significant ? yes | :1 |
| Is the sign bit recorded? no | |
| Is the symbol +ve ? yes | :1 |
| Is the $|C^{L0}(1,1)| > T_o$ ? no | :0 |
| Is the bit in level 0 ? yes | |
| For the bit $B_{P3}^{L0}(2,3)$ of the coefficient $C^{L0}(2,3)$ | |
| Is the bit significant ? yes | :1 |
| Is the sign bit recorded? no | |
| Is the symbol +ve ? yes | :1 |
| Is the $|C^{L0}(2,3)| > T_o$ ? no | :0 |
| Is the bit in level 0 ? yes | |

The following 6 bits are generated for subband #2: 1, 1, 0; 1, 1, 0. The marked-matrix is illustrated in FIG. 11. In this example, for the final plane of coding, the proposed scheme is so efficient that the left over bits need not be coded, because the bits remaining to be coded are the most significant bits in that plane, so whether the coefficient is positive or negative may, instead, be recorded. In the above example, if this latter approach is employed, the number of symbols needed to code in the last stage is 2 bits, rather than 6 bits.

The total number of bits to code the above matrix, then, is 68 bits in this example Although the claimed subject matter is not limited in scope in this respect, this stream of symbols may subsequently be encoded. Any encoding scheme may be employed, such as entropy-coding schemes, like huffman coding, arithmetic coding (AC), etc. This stream may be preceded by a header block, which may contains the number of planes coded, such as 3 in this case, along with the information of the transform, e.g., dimensions of the image, the number of levels of transform applied, etc.

Again, this is just one example of a possible implementation and the claimed subject matter is not limited in scope to this example. An embodiment of a process to decode a bit or symbol stream is described as follows, although, again, the claimed subject matter is not limited in scope to this example. This is just one possible embodiment provided for purposes of illustration.

Such as embodiment of a method of embedded zero tree decoding discrete wavelet transform (DWT) coefficients that have been encoded may include applying a bit-based conditional decoding to the encoded DWT coefficients. For example, this may include decoding by using one or more binary-valued variables, the value depending on whether one or more conditions was true or false when applied during encoding to the coefficient being decoded. At least one of the one or more conditions may relate to the magnitude relative to a threshold, during encoding, of the coefficient being decoded. Furthermore, as previously described in connection with encoding, although the subject matter is not limited in scope in this respect, applying a bit-based conditional decoding to encoded DWT coefficients having relatively low energy may produce good results.

In this embodiment, a decoder receiving the bit stream generated by an encoder that applies the approach described above reconstructs the coefficient matrix. This particular approach to decoding is illustrated by the state diagram shown in FIG. 12.

The initial state is $S_0$. The decoder starts decoding the $n^{th}$ bit of a coefficient, following the coding order of coefficients, as previously described, for this particular embodiment. In this embodiment, decoding starts from the least significant bit (LSB) plane and proceeds towards the most significant bit (MSB) plane, although alternative approaches, such as MSB to LSB may be employed in different embodiments.

Figure 12:
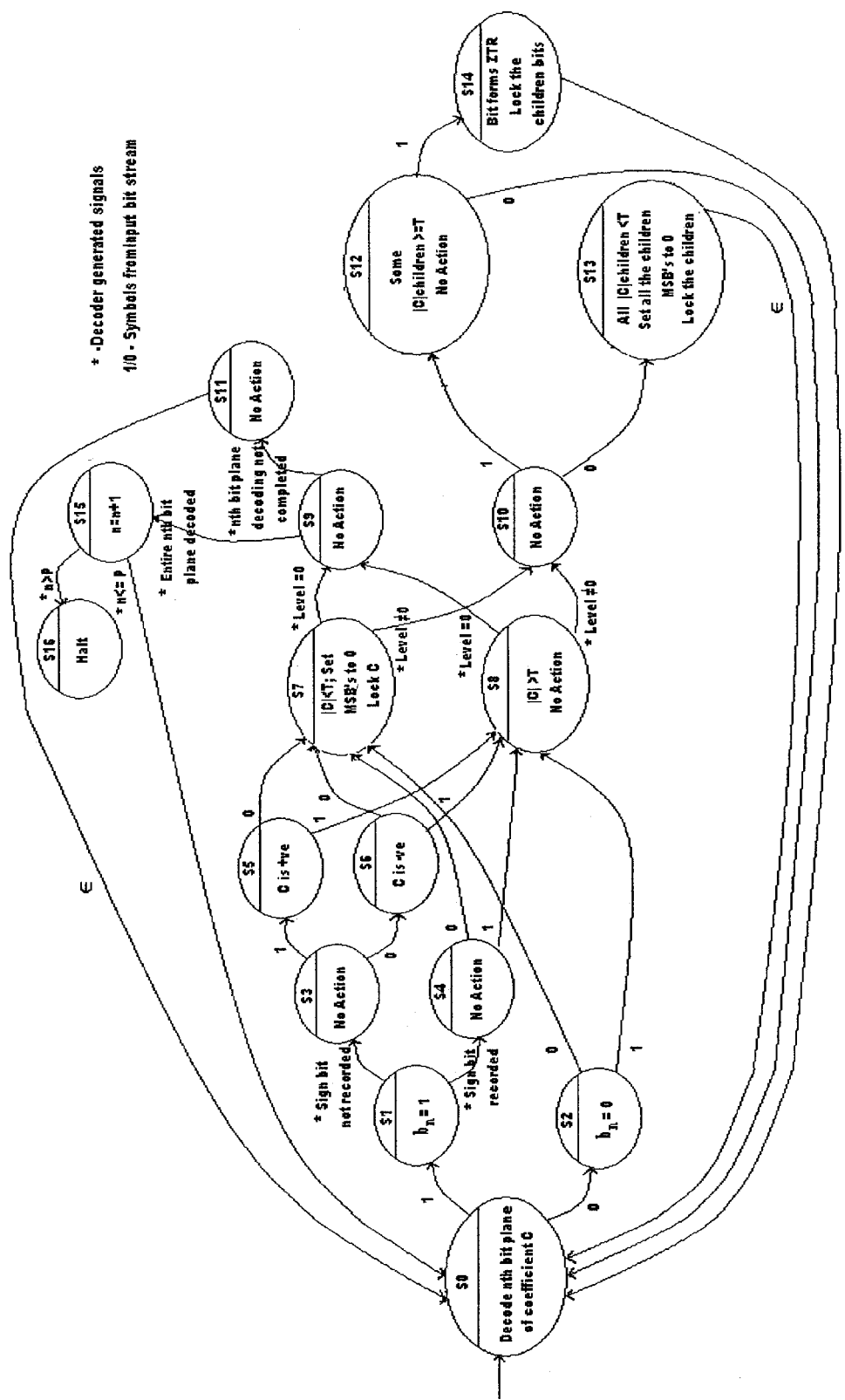
FIG. 12 is the encoded sample portion of FIG. 11 at a point in a process of applying an embodiment to decode the encoded sample portion.

Following bits in the input bit stream, the process moves from one state to another. The symbols marked with an asterisk (*) in FIG. 12 are generated by the decoder depending upon the partial decoding result at that point in the process. Operation of the decoder is further explained by decoding the bit stream generated above. Again, this example is not limited and is provided simply for illustration purposes.

From the header, the following information may be decoded in this particular embodiment, although, again, the claimed subject matter is not limited in scope in this respect:

maximum number of passes; dimension of the matrix; number of levels of transform.

The decoding scheme is illustrated below applying the previous example. As noted previously, for this particular embodiment, for the nth pass, the nth bits of the coefficients are being decoded.
For Pass_Index=1;

Subband #1 (decoding)

| Input Stream | Condition Implied | Coefficient (C) | value |
|---|---|---|---|
| 1 | :Coefficient is significant | (1,1) | 1 |
| 1 | :Coefficient is positive | (1,1) | + 1 |
| 0 | :C <To (Coefficient lost it's significance) | (1,1) | +001 |
| 1 | :some $C_{|children|}$>To | | |
| 0 | :B does not form ZTR | | |
| 1 | :Coefficient is significant | (1,2) | 1 |
| 1 | :Coefficient is positive | (1,2) | + 1 |

-continued

Subband #1 (decoding)

| Input Stream | Condition Implied | Coefficient (C) | value |
|---|---|---|---|
| 0 | :C <To (Coefficient lost it's significance) | (1,2) | +001 |
| 1 | :some $C_{|children|}$>To | | |
| 0 | :B does not form ZTR | | |
| 0 | :Coefficient is not Significant | (2,1) | 0 |
| 0 | :C<To(Coefficient lost it's significance) | (2,1) | 000 |
| 1 | :some $C_{|children|}$>To | | |
| 1 | :B does formZ TR | | |
| 0 | :Coefficient is not Significant | (2,2) | 0 |
| 1 | :C>To | (2,2) | 0 |
| 1 | :some $C_{|children|}$>To | | |
| 0 | :B does not form ZTR | | |

The decoded matrix at this point is illustrated in FIG. 13.
For Pass_Index=1;

Subband #2 (decoding)

| Input Stream | Condition Implied | Coefficient(C) | value |
|---|---|---|---|
| 0 | :Coefficient is not significant | (1,1) | 0 |
| 1 | :C <To (Coefficient not lost it's significance) | (1,1) | 0 |
| 1 | :Coefficient is significant | (1,2) | 1 |
| 1 | :Coefficient is positive | (1,2) | + 1 |
| 0 | :C <To (Coefficient lost it's significance) | (1,2) | +001 |
| 1 | :Coefficient is significant | (2,1) | 1 |
| 0 | :Coefficient is negative | (2,1) | − 1 |
| 0 | :C <To (Coefficient lost it's significance) | (2,1) | −001 |
| 0 | :Coefficient is not significant | (2,2) | 0 |
| 0 | :C <To (Coefficient lost it's significance) | (2,2) | 000 |
| 0 | :Coefficient is not significant | (1,3) | 0 |
| 0 | :C <To (Coefficient lost it's significance) | (1,3) | 000 |
| 0 | :Coefficient is not significant | (1,4) | 0 |
| 0 | :C <To (Coefficient lost it's significance) | (1,4) | 000 |
| 0 | :Coefficient is not significant | (2,3) | 0 |
| 1 | :C <To (Coefficient not lost it's significance) | (2,3) | 0 |
| 1 | :Coefficient is significant | (2,4) | 1 |
| 1 | :Coefficient is positive | (2,4) | + 1 |
| 1 | :C <To (Coefficient not lost it's significance) | (2,4) | + 1 |
| 0 | :Coefficient is not significant | (3,3) | 0 |
| 0 | :C <To (Coefficient lost it's significance) | (3,3) | 000 |
| 1 | :Coefficient is significant | (3,4) | 1 |
| 0 | :Coefficient is negative | (3,4) | − 1 |
| 0 | :C <To (Coefficient lost it's significance) | (3,4) | −001 |
| 1 | :Coefficient is significant | (4,3) | 1 |
| 1 | :Coefficient is positive | (4,3) | + 1 |
| 0 | :C <To (Coefficient lost it's significance) | (4,3) | +001 |
| 0 | :Coefficient is not significant | (4,4) | 0 |
| 0 | :C <To (Coefficient lost it's significance) | (4,4) | 000 |

The decoded matrix at this point in the process is illustrated in FIG. 14

For Pass_Index=2, $T_0$ (Threshold)=1*2=2;

Subband #1 (decoding)

| | | | |
|---|---|---|---|
| 1 | :Coefficient is significant | (2,2) | 1 |
| 1 | :Coefficient is positive | (2,2) | + 1 |
| 0 | :C <To (Coefficient lost it's significance) | (2,2) | +001 |
| 0 | :$C_{|children|}$<To | | |

For pass_index=2; after subband#1 decoding, the decoded matrix that results is illustrated in FIG. 15.

Subband #2

| | | | |
|---|---|---|---|
| 0 | :Coefficient is not significant | (1,1) | 00 |
| 1 | :C <To (Coefficient not lost it's significance) | (1,1) | 00 |
| 0 | :Coefficient is not significant | (2,3) | 00 |
| 1 | :C <To (Coefficient not lost it's significance) | (2,3) | 00 |
| 1 | :Coefficient is significant | (2,4) | + 11 |
| 0 | :C <To (Coefficient lost it's significance) | (2,4) | +011 |
| 0 | :Coefficient is not significant | (3,1) | 00 |
| 0 | :C <To (Coefficient lost it's significance) | (3,1) | 000 |
| 1 | :Coefficient is significant | (3,2) | 10 |
| 1 | :Coefficient is positive | (3,2) | +10 |
| 0 | :C <To (Coefficient lost it's significance) | (3,2) | +010 |
| 0 | :Coefficient is not significant | (4,1) | 00 |
| 0 | :C <To (Coefficient lost it's significance) | (4,1) | 000 |
| 0 | :Coefficient is not significant | (4,2) | 00 |
| 0 | :C <To (Coefficient lost it's significance) | (4,2) | 000 |

The decoded matrix at this point is illustrated in FIG. 16.

For Pass_Index=3, $T_0$(Threshold)=2*2=4.
Subband #1
No input bits are read as all the coefficients are coded.
For pass index=3; after subband#1 decoding, the decoded matrix is illustrated in FIG. 17.

Subband #2

| | | | |
|---|---|---|---|
| 1 | :Coefficient is significant | (1,1) | 100 |
| 1 | :Coefficient is positive | (1,1) | +100 |
| 0 | :C <To (Coefficient lost it's significance) | (1,1) | +100 |
| 1 | :Coefficient is significant | (2,3) | 100 |
| 1 | :Coefficient is positive | (2,3) | +100 |
| 0 | :C <To (Coefficient lost it's significance) | (2,3) | +100 |

The decoded matrix is illustrated in FIG. 18.

The claimed subject matter, such as the embodiments previously described, provide several potential advantages. For example, such an approach may be computationally faster and may code wavelet coefficients while employing fewer bits. For example, bits that are not significant may not be coded in some embodiments. Likewise, for Shapiro's embedded zero-tree wavelet coding approach, the ZTR (zero tree root) is checked only if the bit is not significant. Therefore, in at least some embodiments of the claimed subject matter, more ZTR may be exploited in the subband decomposition by checking more coefficients. Furthermore, passing over the smaller or not significant coefficients is not done in every pass. For example, in some embodiments, these coefficients are encoded in the course of initial passes. Likewise, the two passes of the classical scheme has been reduced to a single pass, such as for the embodiments previously described. Furthermore, it is desirable to stop coding when the significance of the coefficient is lost. Such an approach was illustrated in the previously described embodiment. In addition, parallel execution of coding operations may be employed in some embodiments due at least in part to applying a coding bit plane wise approach, such as was illustrated previously, although, again, the subject matter is not limited to this embodiment or to this aspect of this embodiment.

It will, of course, be understood that, although particular embodiments have just been described, the claimed subject matter is not limited in scope to a particular embodiment or implementation. For example, one embodiment may be in hardware, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging or video system, for example, may result in an embodiment of a method in accordance with the claimed subject matter being executed, such as an embodiment of a method of coding or decoding wavelet transformed coefficients, for example, as previously described. For example, an image processing platform or an image processing system may include an image or video processing unit, an image or video input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. A method of embedded zero tree coding discrete wavelet transform (DWT) coefficients comprising:
    applying a bit-based conditional coding to the DWT coefficients, including checking zero tree root for each coefficient.

2. The method of claim 1, wherein applying a bit-based conditional coding comprises coding using one or more binary-valued variables, the value depending on whether one or more conditions applied to the coefficient being coded is true or false.

3. The method of claim 2, wherein at least one of the one or more conditions relates to the magnitude of the coefficient being coded relative to a threshold.

4. The method of claim 1, wherein the DWT coefficients are coded using multiple passes, and wherein the threshold of the next successive pass from a particular pass is a multiplicative factor greater than one times the threshold of the particular pass.

5. The method of claim 4, wherein the multiplicative factor is two.

6. The method of claim 1, wherein applying a bit-based conditional coding comprises applying a bit-based conditional coding to DWT coefficients having relatively low energy.

7. An integrated circuit comprising:
    an architecture to apply a bit-based conditional embedded zero tree coding to discrete wavelet transform (DVVT) coefficients, including checking zero tree root for each coefficient.

8. The integrated circuit of claim 7, wherein the architecture comprises at least one of the following: hardware, software, firmware, and any combination thereof.

9. The integrated circuit of claim 7, wherein the architecture is adapted to apply a bit-based conditional coding comprising coding using one or more binary-valued variables, the value depending on whether one or more conditions applied to the coefficient being coded is true or false.

10. The integrated circuit of claim 9, wherein at least one of the one or more conditions that the architecture is adapted to apply relates to the magnitude of the coefficient being coded relative to a threshold.

11. The integrated circuit of claim 7, wherein the architecture is adapted to code the DWT coefficients in multiple passes, and
    wherein the threshold of the next successive pass from a particular pass is a multiplicative factor greater than one times the threshold of the particular pass.

12. The integrated circuit of claim 11, wherein the multiplicative factor is two.

13. A method of embedded zero tree decoding discrete wavelet transform (DWT) coefficients that have been encoded, said method comprising:
    applying a bit-based conditional decoding to the encoded DWT coefficients, including checking zero tree root for each coefficient.

14. The method of claim 13, wherein applying a bit-based conditional decoding comprises decoding using one or more binary-valued variables, the value depending on whether one or more conditions was true or false when applied during encoding to the coefficient being decoded.

15. The method of claim 14, wherein at least one of the one or more conditions relates to the magnitude relative to a threshold, during encoding, of the coefficient being decoded.

16. The method of claim 13, wherein applying a bit-based conditional decoding comprises applying a bit-based conditional decoding to encoded DWT coefficients having relatively low energy.

17. An integrated circuit comprising:
    an architecture to apply a bit-based conditional embedded zero tree decoding to discrete wavelet transform (DWT) coefficients that have been encoded, including checking zero tree root for each coefficient.

18. The integrated circuit of claim 17, wherein the architecture comprises at least one of the following: hardware, software, firmware, and any combination thereof.

19. The integrated circuit of claim 17, wherein the architecture is adapted to apply a bit-based conditional decoding comprising decoding using one or more binary-valued variables, the value depending on whether one or more conditions was true or false when applied during encoding to the coefficient being decoded.

20. The integrated circuit of claim 19, wherein at least one of the one or more conditions relates to the magnitude relative to a threshold, during encoding, of the coefficient being decoded.

21. An article comprising: a storage medium having stored thereon instructions that, when executed by a computing platform, result in a method of embedded zero tree coding discrete wavelet transform (DVVT) coefficients being preformed by:
  applying a bit-based conditional coding to the DWT coefficients, including checking zero tree root for each coefficient.

22. The article of claim 21, wherein said instructions, when executed, further result in applying a bit-based conditional coding comprises coding using one or more binary-valued variables, the value depending on whether one or more conditions applied to the coefficient being coded is true or false.

23. The article of claim 22, wherein said instructions, when executed, further result in at least one of the one or more conditions relating to the magnitude of the coefficient being coded relative to a threshold.

24. An article comprising: a storage medium having stored thereon instructions that, when executed by a computing platform, result in a method of embedded zero tree decoding discrete wavelet transform (DWT) coefficients that have been encoded by:
  applying a bit-based conditional decoding to the encoded DWT coefficients, including checking zero tree root for each coefficient.

25. The article of claim 24, wherein said instructions, when executed, further result in applying a bit-based conditional decoding comprises decoding using one or more binary-valued variables, the value depending on whether one or more conditions was true or false when applied during encoding to the coefficient being decoded.

26. The article of claim 25, wherein said instructions, when executed, further result in at least one of the one or more conditions relating to the magnitude relative to a threshold, during encoding, of the coefficient being decoded.

27. A system comprising:
  a computing platform;
  said computing platform including a processor, a memory, and a bus for communication to occur between said processor and memory;
  said computing platform including an architecture adapted to, during operation, perform a method of embedded zero tree coding discrete wavelet transform (DWT) coefficients by applying a bit-based conditional coding to the DWT coefficients, including checking zero tree root for each coefficient.

28. The system of claim 27, wherein the architecture comprises at least one of the following: hardware, software, firmware, and any combination thereof.

29. The system of claim 27, wherein the architecture is adapted to, during operation, apply a bit-based conditional coding comprising coding using one or more binary-valued variables, the value depending on whether one or more conditions applied to the coefficient being coded is true or false.

30. A system comprising:
  a computing platform;
  said computing platform including a processor, a memory, and a bus for communication to occur between said processor and memory;
  said computing platform including an architecture adapted to, during operation, perform a method of embedded zero tree decoding encoded discrete wavelet transform (DWT) coefficients by applying a bit-based conditional decoding to the encoded DWT coefficients, including checking zero tree root for each coefficient.

31. The system of claim 30, wherein the architecture comprises at least one of the following: hardware, software, firmware, and any combination thereof.

32. The system of claim 30, wherein the architecture is adapted to, during operation, apply a bit-based conditional decoding comprising decoding using one or more binary-valued variables, the value depending on whether one or more conditions applied to the coefficient being decoded was true or false when applied during encoding to the coefficient being decoded.

* * * * *

UNITED STATES PATENT AND TRADEMARK OFFICE
CERTIFICATE OF CORRECTION

PATENT NO. : 6,834,123 B2
DATED : December 21, 2004
INVENTOR(S) : Acharya et al.

It is certified that error appears in the above-identified patent and that said Letters Patent is hereby corrected as shown below:

Column 12,
Line 14, delete "DVVT" and insert -- DWT --.

Column 13,
Line 11, delete "DVVT" and insert -- DWT --.

Signed and Sealed this

Twenty-first Day of June, 2005

JON W. DUDAS
*Director of the United States Patent and Trademark Office*